United States Patent [19]
Nago

[11] Patent Number: 5,452,167
[45] Date of Patent: Sep. 19, 1995

[54] SOFT MAGNETIC MULTILAYER FILMS FOR MAGNETIC HEAD

[75] Inventor: Kumio Nago, Ikoma, Japan

[73] Assignee: Matsushita Electric Industrial Co., Ltd., Kadoma, Japan

[21] Appl. No.: 220,482

[22] Filed: Mar. 31, 1994

[30] Foreign Application Priority Data

Mar. 31, 1993 [JP] Japan .................... 5-073205
Oct. 6, 1993 [JP] Japan .................... 5-250475

[51] Int. Cl.⁶ .......................................... G11B 5/147
[52] U.S. Cl. ............................................... 360/126
[58] Field of Search ................................. 360/126

[56] References Cited

U.S. PATENT DOCUMENTS 5,227,193  7/1993  Hori et al. .
5,304,258  4/1994  Ishiwata et al. ............. 360/126 X

FOREIGN PATENT DOCUMENTS 0502535    9/1992   European Pat. Off. .
92-205988  6/1993   European Pat. Off. .
92-429248  7/1993   European Pat. Off. .
61-230607  10/1986  Japan .
02-275605  11/1990  Japan .
04-367205  12/1992  Japan .

OTHER PUBLICATIONS

K. Nago et al., "Double-Structured Laminated Heads with Substrate Bias-Sputtered FeTaN Films" Bulletin of Japan Applied Magnetism Society, vol. 18, No. 2, pp. 99–102 (1994).

Primary Examiner—A. J. Heinz
Attorney, Agent, or Firm—Willian Brinks Hofer Gilson & Lione

[57] ABSTRACT

This soft magnetic multilayer film is magnetic isotropic and is provided with a high saturation magnetic flux density and an anisotropy of high magnetic permeability, so that it is suitable for the various magnetic head at a high production yield. The soft magnetic multilayer film is comprised of at least one film unit, which comprises a plurality of soft magnetic layers made of Fe—M—N component alloy or Fe—M—B—N component alloy are laminated through a non-magnetic insulating layer on a bias-applied substrate by means of a sputtering and are provided with a high magnetic permeability which direction is different from both neighboring soft magnetic layers through the magnetic insulating layer.

21 Claims, 8 Drawing Sheets

RUNNING DIRECTION

RUNNING DIRECTION

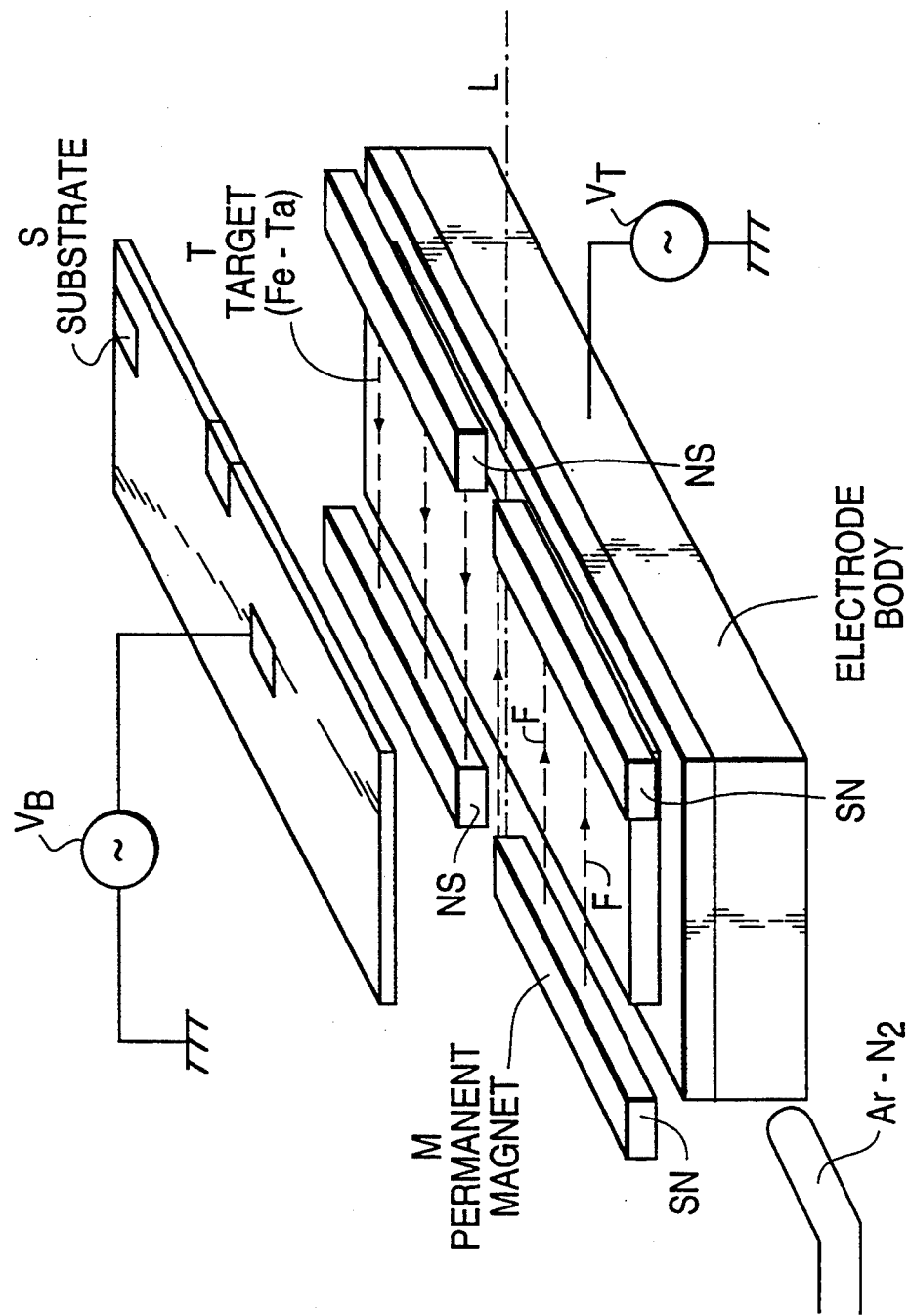

SOFT MAGNETIC MULTILAYER FILMS FOR MAGNETIC HEAD

BACKGROUND OF THE INVENTION

1. Field of the Invention

The present invention relates to a soft magnetic film for use in a magnetic head or core material of a magnetic recording and reproducing apparatus such as a video cassette recorder (VCR), an audio recording and reproducing apparatus and a magnetic recording apparatus for a computer.

2. Description of the Prior Art

In response to the requirement of the high recording density in a recent magnetic recording technology, much attention has been paid to the development of a magnetic head having a superior performance.

In order to satisfy the requirement mentioned above, various types of magnetic heads have been developed: One example as shown in FIG. 10 is a magnetic head of a laminated-type head having a ring shape in which the core material is made of an integrated layers of a soft magnetic film 17 and an electric insulating film 18 integrated alternately to each other and is sandwitched between a pair of non-magnetic substrates 19. The core material forms a magnetic path. 20 denotes a glass material and 21 a magnetic gap.

Another example as shown in FIG. 12 is a magnetic head (referred to as MIG head) in which the majority of the magnetic path is composed of ferrite material 22 and at the vicinity of the magnetic gap 23 easily saturated magnetically there is provided with a soft magnetic film 24. 25 denotes a glass material.

In the case of the laminated type head, there is shown a contacting surface in FIG. 11, while in the case of MIG type head there is shown a contacting surface in FIG. 13.

In the magnetic heads, the performance thereof relates closely to the material characteristics of the core material. In order to achieve a high recording density, it is necessary for the core material to have a high saturation magnetic flux density (related to mainly to the recording characteristics) and a high magnetic permeability (related mainly to the reproducing characteristics).

In spike of the above requirements, the soft magnetic film made of a conventional Permalloy, Sendust, Co-based amorphous alloy can achieve a high saturation magnetic flux density as low as 1T more or less and can not realize the high density recording because of their limited high saturation magnetic flux density.

Therefore, much attention has been paid to the development of the soft magnetic film made of microcrystals. One of researches is related to a Fe—M—N type film wherein M is an atom or atoms selected from the group consisting of Zr, Hf, Ti, Nb, V, Mo and W as reported in Japanese Patent Kokai No. 2-275605. The other is related to a Fe—M—B—N type film wherein M is an atom or atoms selected from the group consisting of Ta, Zr, Hf, Nb and Ti as reported in Japanese Patent Kokai No. 4-367205.

It is reported in Japanese Applied Magnetic Institute Paper Vol. 14, No. 3 that, the soft magnetic film made of microcrystals provides a large loss of the magnetic permeability at a high frequency band in comparison with the Co-based amorphous alloy film although it has a high saturation magnetic density. In order to improve a rate of reproduction by means of the magnetic head at the high frequency band, it is necessary to improve the magnetic permeability at the high frequency band.

It is generally known in the case of the film made of Sendust and Co-based amorphous alloy that, a thinner thickness of the magnetic film makes the magnetic permeability at the high frequency band improved and also known that, broad band of the magnetic permeability can be realized due to a decrease of an eddy current loss by using a multilayer sot magnetic film prepared by alternatively laminating magnetic layers having a same thickness (3–8 µm) and electric insulating Contrary to this, however, in the case of the soft magnetic multilayer film prepared by alternative lamination of said microcrystal soft magnetic layers and non-magnetic insulating layers, it is found that, thinner and uniform soft magnetic layers and thick non-magnetic insulating layers make the total thickness of the magnetic layers to be decreased and thus the magnetic saturation flux density to be decreased, resulting in degradation of the recording characteristic of the laminated type magnetic head due to incomplete feature utilization of the microcrystal soft magnetic film. Further, the microcrystal film becomes difficult to obtain such an isotropic high magnetic permeability accompanied with an decrease of the film thickness, resulting in degradation of the reproduction characteristic of the laminated type magnetic head.

Furthermore, in the case of using the microcrystal soft magnetic film as a core material of the MIG head or the main pole excitation system head, the soft magnetic film is formed in an strip shape of about 10 µm wide, resulting in decrease of the magnetic permeability due to generation of reflux magnetic domains.

SUMMARY OF THE INVENTION

Therefore, in order to improve the recording and reproducing characteristic, particularly at the high frequency band, it is necessary to increase a high frequency permeability while keeping the high saturation magnetic flux density and the high isotropic permeability. It is a first object of the present invention to provide a soft magnetic multilayer film having a high magnetic saturation flux density (Bs) and a low magnetostriction as well as a high magnetic permeability ($\mu'$, $\mu''$), particularly at a high frequency band.

Further, a second object of the present invention is to provide a magnetic head with a core material made of the soft magnetic multilayer film, which has a superior recording and reproducing characteristic at the high frequency band.

According to one aspect of the present invention, there is provided with a soft magnetic multilayer film for a magnetic head comprising at least one film unit which comprises a plurality of soft magnetic layers made of Fe—M—N component alloy or Fe—M—B—N component alloy wherein M is at least one atom selected from the group consisting of Zr, Hf, Ti, Nb, Ta, V, Mo, W and Cr, characterized in that a plurality of the soft magnetic layers are laminated through a non-magnetic insulating layer on a bias-applied substrate by means of a sputtering and are provided with a high magnetic permeability which direction is different from both neighboring soft magnetic layers through the non-magnetic insulating layer in a manner to have totally a substantial magnetic isotropy.

In an embodiment of the present invention, it is preferable that in the case of the soft magnetic layer of Fe—M—N component alloy, it mainly consists of Fe and contains 6–17 atom % of N and 7–15 atom % of M, while in the case of the soft magnetic layer of Fe—M—B—N component alloy, it mainly consists of Fe and contains 6–15 atom % of N, 7–15 atom % of M and 0.5–13 atom % of B. Among them, it is more preferable that the soft magnetic layer is made of Fe—Ta—N or Fe—Ta—B—N component alloy and the non-magnetic insulating layer is made of $SiO_2$ or $Al_2O_3$.

In the soft magnetic multilayer film according to the present invention, the unit film is composed of at least two kinds of the soft magnetic layers having a different thickness since the thinner magnetic layer has a high permeability mainly at a high frequency while the other thicker magnetic layer has a high saturation magnetic flux density mainly at a high frequency.

Further, the unit film is preferably composed of at least two kinds of the non-magnetic insulating layers having a different thickness, since the unit films should are laminated through one kind of a non-magnetic insulating layer for preventing an eddy current and the magnetic layers of the unit film should be laminated through the other kind of the non-magnetic insulating layer in the case of the laminated type head. On the other hand, in the case of the MIG type head, since the unit film is sandwiched by a pair of the non-magnetic insulating layer for preventing generation of a pseudo-gap due to diffusion between the ferrite and the magnetic layer.

In the soft magnetic multilayer film, it is preferable that the soft magnetic layer has a thickness of 0.05 to 5 μm. On the other hand, it is preferable that the non-magnetic insulating layer has a thickness of 5 to 300 nm because of the above reason.

In the soft magnetic multilayer film according to the present invention, each of the soft magnetic layers neighboring through the non-magnetic insulating layer is formed on the substrate with a different bias-power including zero by means of a sputtering. The method for making a soft magnetic film according to the present invention may be made by using a sputtering apparatus provided with a sputtering electrode which has permanent magnets arranged above a target of a rectangular flat plate in such a way that lines of magnetic force generated by said permanent magnets are in parallel to the surface of said target of a rectangular flat plate and the magnetic strength distribution separated at the center line of said target of a rectangular flat plate is symmetrical while the lines of magnetic force at the right side of said center line is being of a reverse direction to that of the left side of said center line as shown in FIG. 14. The Detailed is described in U.S. Ser. No. 08/111,055 filed on Aug. 24, 1993.

The above magnetic isotropic multi-structured multilayer film can be used for a multi-structured and laminated type and a MIG type head. Therefore, According to a second aspect of the present invention, there is provided a multi-structured and laminated head made of soft magnetic multilayer films as shown in FIG. 1, wherein a laminating unit of the multilayer film comprising a plurality of soft magnetic layers 3 made of Fe—M—N component alloy or Fe—M—B—N component alloy wherein M is at least one atom selected from the group consisting of Zr, Hf, Ti, Nb, Ta, V, Mo, W and Cr, are laminated through a non-magnetic insulating layer 2 on a bias-applied substrate 5 by means of a sputtering to be provided with a high magnetic permeability which direction is different from both neighboring soft magnetic layers through the non-magnetic insulating layer in a manner to have totally a substantial magnetic isotropy and a plurality of the film units should are laminated through a separating non-magnetic insulating layer for mainly preventing an eddy current loss.

Further, according to a third aspect of the present invention, there is provided a magnetic isotropic head of MIG type made of soft magnetic multilayer film as shown in FIG. 2, wherein the multilayer film comprising a plurality of soft magnetic layers 7 and 8 made of Fe—M—N component alloy or Fe—M—B—N component alloy wherein M is at least one atom selected from the group consisting of Zr, Hf, Ti, Nb, Ta, V, Mo, W and Cr, are laminated through a non-magnetic insulating layer 9 for preventing generation of flux magnetic domains on a bias-applied substrate by means of a sputtering to be provided with a high magnetic permeability which direction is different from both neighboring soft magnetic layers through the non-magnetic insulating layer in a manner to have totally a substantial magnetic isotropy and are sandwiched at the right and left sides in a running direction with a pair of separating non-magnetic insulating layers for preventing generation of an pseudo-gap due to diffusion between a ferrite 12 and the magnetic layer 7.

The resultant soft magnetic film comprises a mixture of fine crystals of α-Fe and fine metal nitride particles. The fine crystals of α-Fe solve at least one element or compound selected from the group consisting of (Zr, Hf, Ti, Nb, Ta, V, Mo, W and Cr), N (nitrogen) and metal (M) nitride which expand the lattice of α-Fe and have an average grain size less than 15 nm while fine crystals of metal nitride have a grain size less than 5 nm and it shows a higher performance in the soft magnetic characteristics.

According to the soft magnetic films which are separated from each other through an electrically insulating film, by means of negative bias powers (including zero) different from each other, the resultant soft magnetic film formed on the substrate shows an isotropic high permeability distributed uniformly at a wide area and is manufactured effectively in a large scale to practice a soft magnetic film for use in a core material of the laminated-type head.

The head comprising the soft magnetic film as at least a part of magnetic circuit which is formed by the present invention realize a high mass-production and a superior record reproducible characteristics against a high coercive force media.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which: FIG. 14 is a schematic view of the sputtering apparatus for preparing the soft magnetic multilayer film according to the present invention,

DETAILED DESCRIPTION OF THE PREFERRED EMBODIMENTS

FIG. 14 is a perspective view showing the sputtering electrode and the position of the substrate in the sputtering apparatus for preparing the multilayer film according to the present invention. In FIG. 14, a target T of a rectangular shape has permanent magnets M arranged at the side thereof to form magnetic circuit for generation of a magnetic field. Each of permanent magnets M comprises plural small magnets for the purpose to change the strength of the magnetic field. Lines of magnetic force F parallel to the surface of the target T of a rectangular shape are in parallel to the center line L of the target T and are arranged symmetrically against the center line L in connection with the intensity of line of magnetic force F. Further, the lines of magnetic force F at the right side of the center line L is in a reverse direction to the lines of magnetic force F at the left side of the center line L. A substrate S is placed above the rectangular shaped target T and is made to be parallel to the surface of the target T and then is applied with a bias power.

When the permanent magnets M are arranged in such a way that the lines of magnetic force F parallel to the surface of the target T is made to be in one direction, the screw motion of electron due to the magnetic field and the electric field is limited to one direction. Accordingly, the plasma density shows a change from a high level to a low level in a direction crossing the lines of the magnetic force F and being parallel to the surface of the target T. As a result, the film thickness distribution shows a large variation.

(Example 1)

The soft magnetic film of the Fe—Ta—N system is prepared with a reactive sputtering method using Ar gas having N$_2$ gas contained therein. The used apparatus is the sputtering apparatus shown in FIG. 4. The used target is a Fe87%-Ta13% target of a rectangular shape of length 127 mm and width 381 mm. A substrate holder for holding a substrate has an effective area of $2.7 \times 10^{-2} m^2$ (length 100 mm and width 270 mm) and is applied with a RF bias power of 0 and 20 W (in view of the power density, 0 and $20 \times 5$, 556/150 W/m$^2$). The soft magnetic film of Fe—Ta—N system having a thickness of about 1 μm is formed on a ceramic substrate which is water cooled at an Ar atmosphere with induced N$_2$ and then subjected to a heat treatment at a vacuum atmosphere of 550° C. under no magnetic field for one hour.

The composition of the magnetic film of Fe—Ta—N system is analyzed with RBS (Rutherford back scattering method) and it is confirmed that the resultant film comprises Fe 78.5 atom %, Ta 10.5 atom % and N 11 atom % and may contain inevitably O and Ar as a trace impurity.

Figure 3:
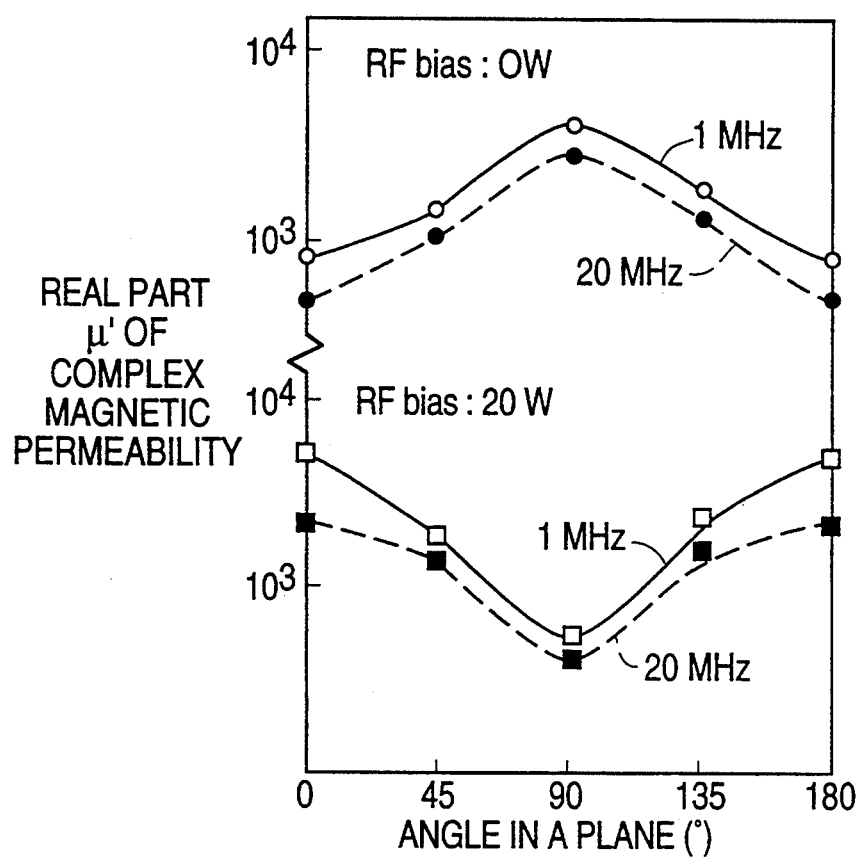
FIG. 3 is a graph showing a Real part ($\mu'$) variation of the in-plane complex magnetic permeability for Fe—Ta—N films sputtered with RF biases of 0 W and 20 W applied to the substrate.

FIG. 3 shows a Real part ($\mu'$) variation (at 1 MHz and 20 MHz) of the in-plane complex magnetic permeability for Fe—Ta—N films sputtered with RF biases of 0 W and 20 W applied to the substrate. From the graph, it is understood that both layers sputtered at RF 20 W bias and non-bias indicate an uniaxial direction anisotropy and there is 90° angle regarding the direction of high permeability between the layer sputtered at non-bias and the layer sputtered at RF 20 W bias.

Figure 7:
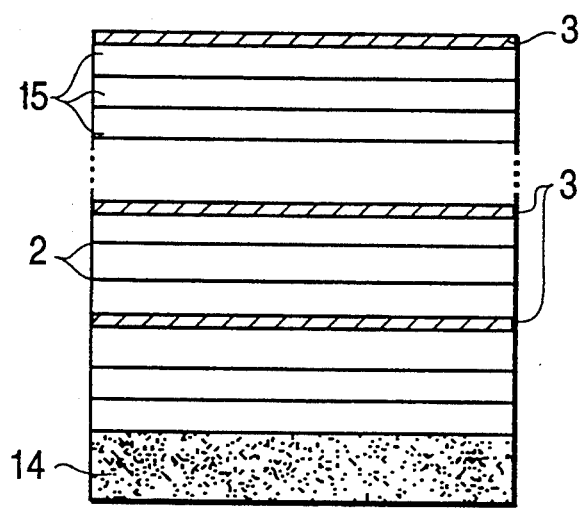
FIG. 7 is an enlarged plane view of the contacting surface of the soft magnetic multilayer film according to a second embodiment of the present invention.

Further, as shown in FIG. 7, a plurality of soft magnetic layers 15 of Fe—Ta—N having a thickness of 1 μm are laminated through a SiO$_2$ insulating layer 2 of 0.05 μm and a SiO$_2$ insulating layer 3 of 0.15 μm to give a soft magnetic multilayer film having a total thickness of about 20 μm. The resulting multilayer film is subjected to a heat treatment at a vacuum atmosphere of 550° C. under no magnetic field for one hour.

Figure 4:
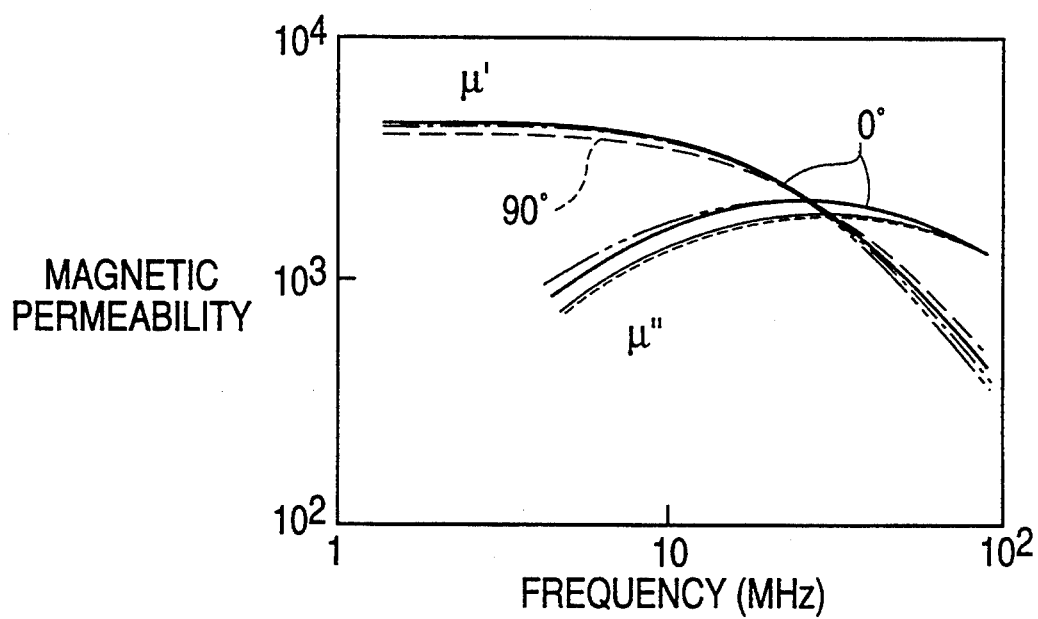
FIG. 4 is a graph showing a frequency response of the permeability (Real part:$\mu'$, Imaginary part:$\mu''$) for a Fe—Ta—N/SiO$_2$ double structured bias-sputtered multilayer films according to the present invention, wherein the sample was measured in four directions: 0°(—), 45°(—·—), 90°(----) and 135°(····)
Figure 5:
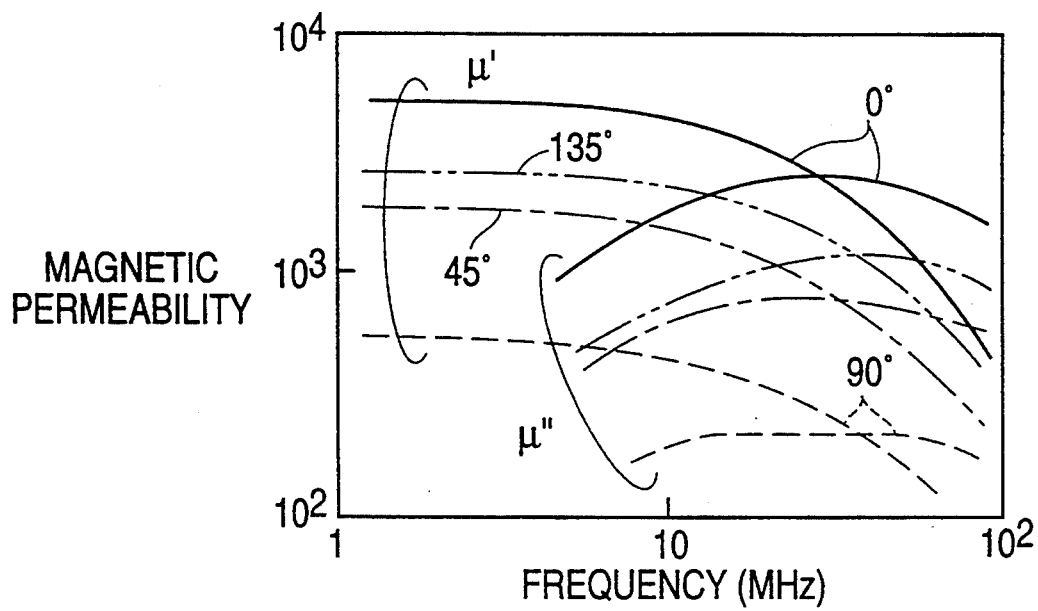
FIG. 5 is a graph showing a frequency response of the permeability ($\mu'$, $\mu''$) for a Fe—Ta—N/SiO$_2$ multilayer films sputtered without any RF bias applied to the substrate, wherein the sample was measured in four same directions as FIG. 4.

FIG. 4 shows a frequency response of the permeability (Real part:$\mu'$, Imaginary part:$\mu''$) for a Fe—Ta—N/SiO$_2$ double structured bias-sputtered multilayer films in which the Fe—Ta—N layers formed at 0 W bias and the Fe—Ta—N layers formed at RF 20 W bias are laminated alternatively through the SiO$_2$ insulating layers as shown in FIG. 7. In comparison with this, FIG. 5 shows a frequency response of the permeability ($\mu'$, $\mu''$) for a Fe—Ta—N/SiO$_2$ multilayer films in which the Fe—Ta—N layers sputtered without any RF bias applied to the substrate are laminated through the SiO$_2$ insulating layer. The both samples were measured in four directions: 0°(—), 45°(—·—) 90°(----) and 135°(····).

As shown in FIG. 5, it is understood that nonvariation of RF bias makes the multilayer film to be uniaxial anisotropic wherein $\mu'$ in the hard axis direction (0° direction) indicates high value of more than 5,000 at 1 MHz while $\mu'$ in the easy axis direction (90° direction) indicates low value of about 500.

However, as shown in FIG. 4, it is understood that variation of RF bias between 0 W and 20 W makes the multilayer film to show an in-plane isotropic permeability and to have a superior high frequency characteristic similar to $\mu'$ in the hard axis direction of the uniaxial anisotropic film as shown in FIG. 5.

Instead of the above RF bias variation method in order to change the direction of high permeability in each layers of the Fe—Ta—N multilayer film, an inclined sputter method may be used.

(Example 2)

Figure 6:
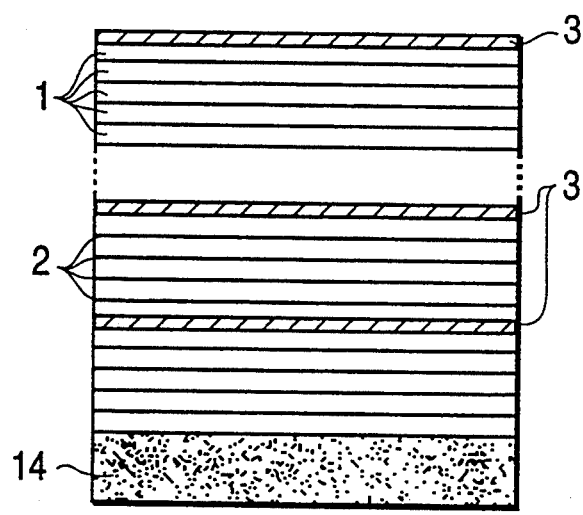
FIG. 6 is an enlarged plane view of the contacting surface of the soft magnetic multilayer film according to a first embodiment of the present invention.
Figure 8:
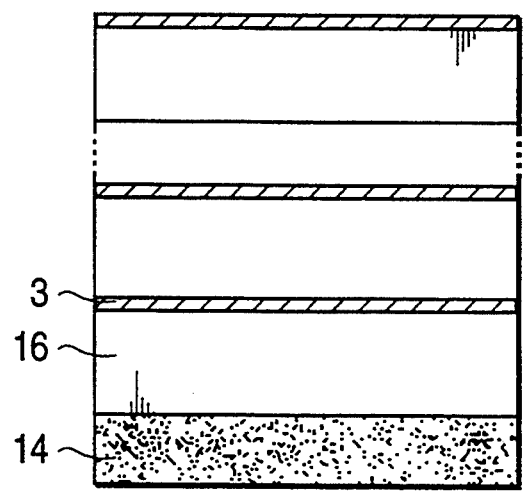
FIG. 8 is an enlarged plane view of the contacting surface of the soft magnetic multilayer film according to a third embodiment of the present invention.

Using the same RF sputter method as the Example 1, three type multilayer films having a total thickness of about 20 μm are prepared on the substrate 14 as shown in FIGS. 6, 7 and 8.

In the case of FIG. 6, a plurality of Fe—Ta—N soft magnetic layers 1 having a thickness of 0.6 μm are laminated through a $SiO_2$ insulating layer 2 of 0.05 μm and a $SiO_2$ insulating layer 3 of 0.15 μm alternatively to give a multilayer film (A). In the case of FIG. 7, a plurality of Fe—Ta—N soft magnetic layers 15 having a thickness of 1 μm are laminated through the $SiO_2$ insulating layer 2 of 0.05 μm and the $SiO_2$ insulating layer 3 of 0.15 μm alternatively to give a multilayer film (B). In the case of FIG. 8, a plurality of Fe—Ta—N soft magnetic layers 16 having a thickness of 2.7 μm are laminated alternatively through the $SiO_2$ insulating layer 3 of 0.15 μm to give a multilayer film (C).

It is confirmed that all the multilayer films (A), (B) and (C) are isotropic ones. In the case of the multilayer films (A) and (B), it is necessary to change the direction of high permeability in each layers thereof, otherwise any isotropic films can not be obtained only by means of laminating the layers because of each soft magnetic layers as thin as 0.6 or 1 μm.

Figure 9:
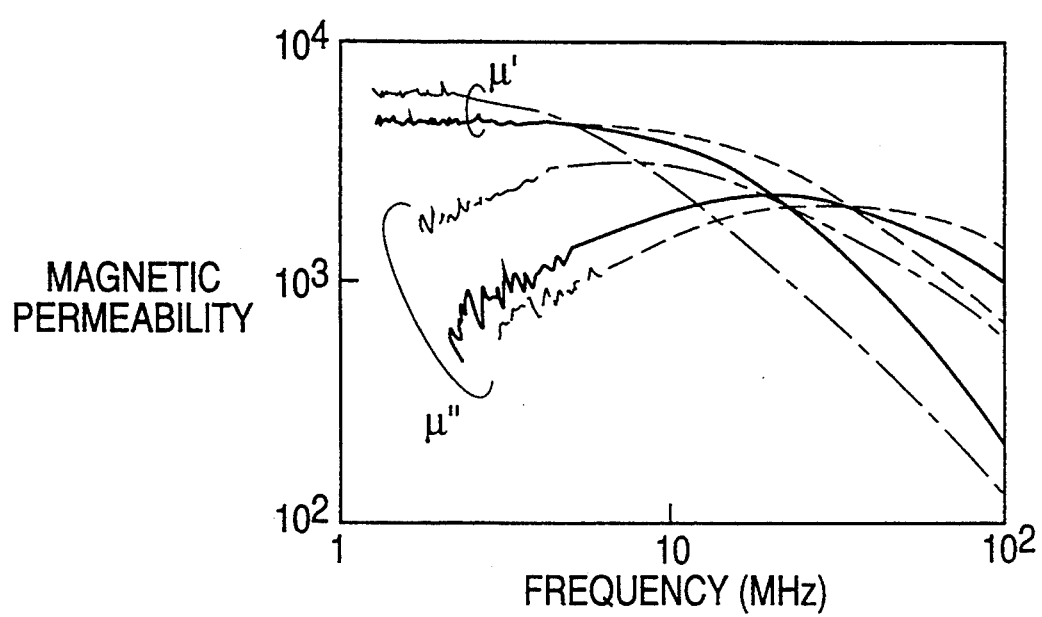
FIG. 9 is a graph showing the frequency dependency in the relation to the magnetic permeability of the soft magnetic film.
Figure 10:
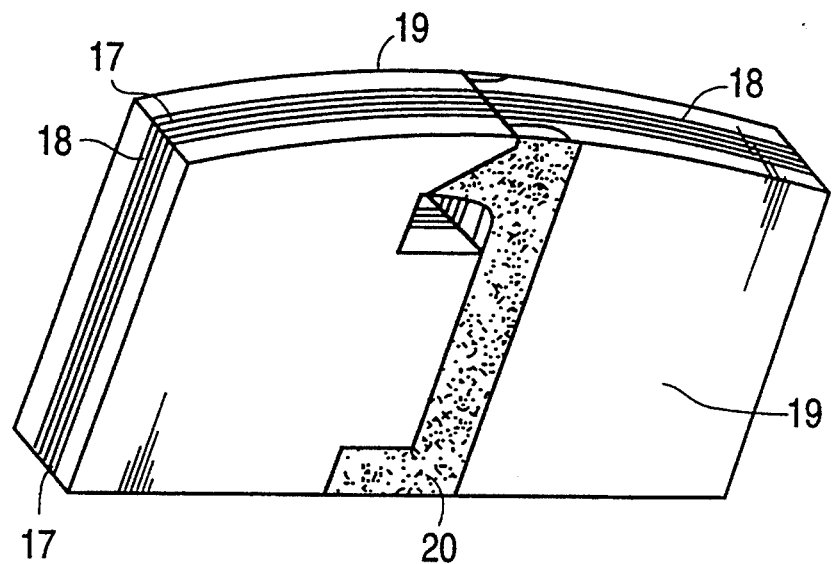
FIG. 10 is a schematic view of the laminated-type head of the prior art.
Figure 11:
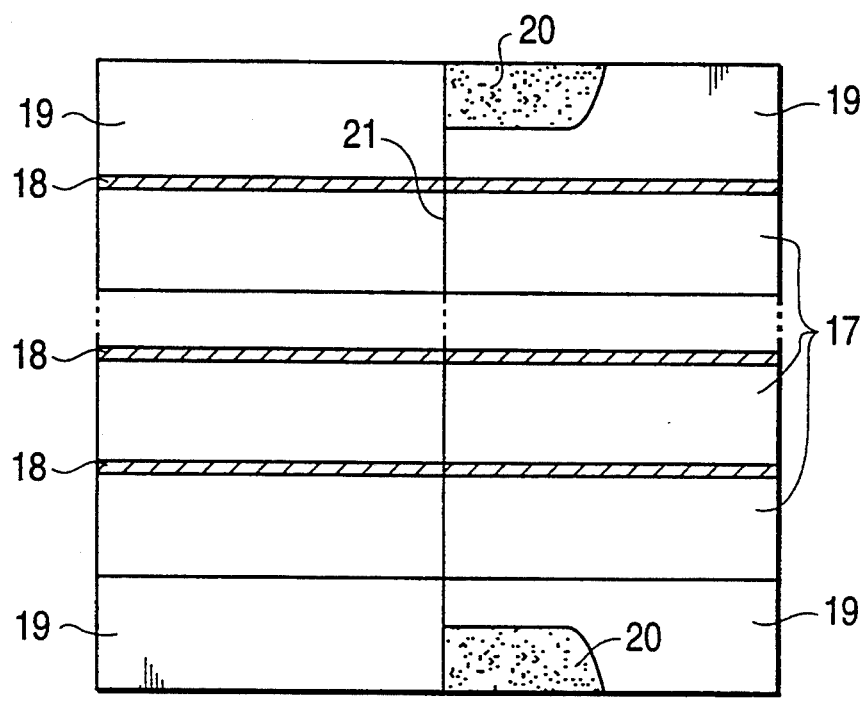
FIG. 11 is an enlarged plane view of the contacting surface of the head shown in FIG. 10.
Figure 12:
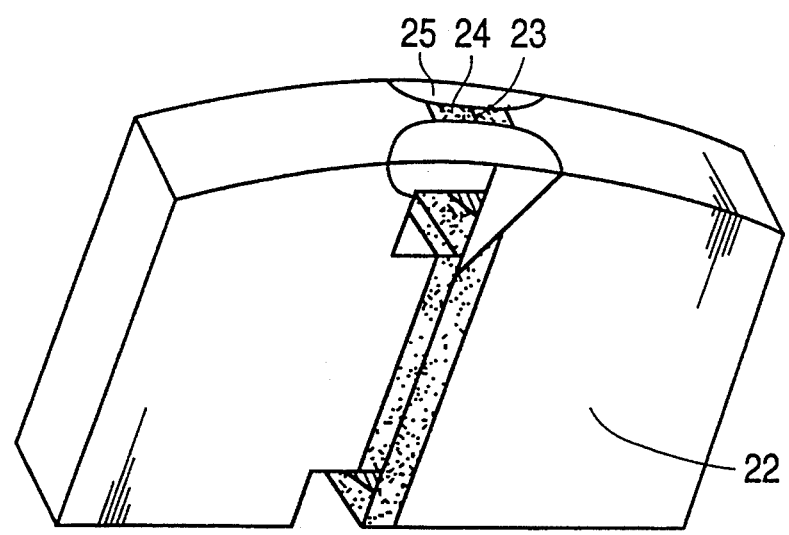
FIG. 12 is a schematic view of the MIG type head according to the prior art.
Figure 13:
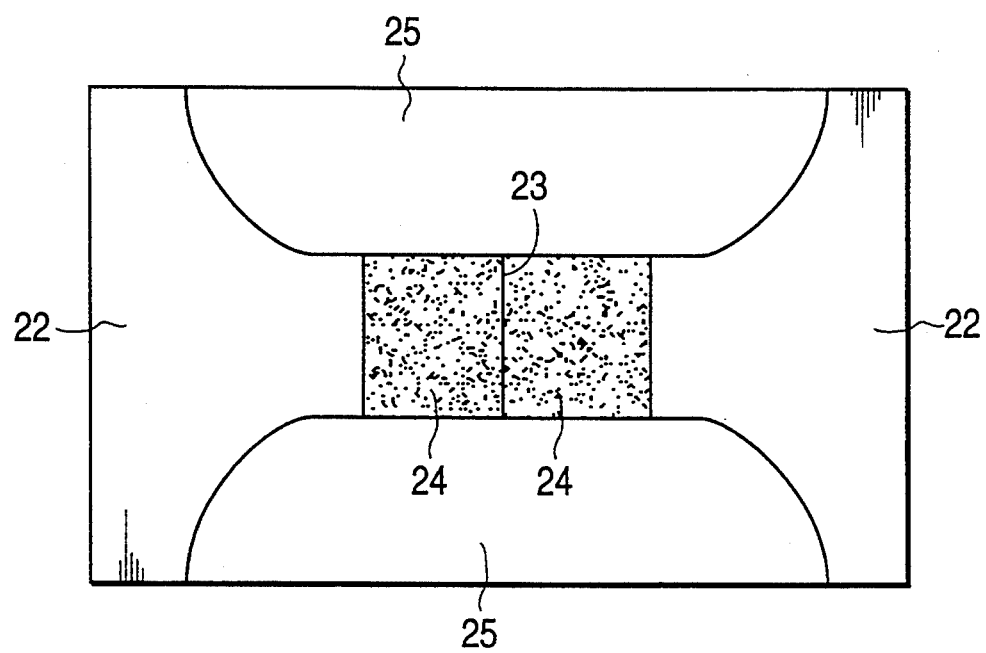
FIG. 13 is an enlarged plane view of the contacting surface of the head shown in FIG. 12.

FIG. 9 shows the frequency dependency in the relation to the real part $\mu'$ and the imaginary part $\mu''$ of the complex magnetic permeability of the soft magnetic film. Comparing the multilayer films (A) and (B) with the multilayer film (C), it is understood that the former cases (A) and (B) shift more to a high frequency side in relation to a frequency indicating maximum value of the imaginary part $\mu''$ and thus have an increased value of the real part at the high frequency band.

These multilayer films (A), (B) and (C) have a saturation magnetic flux density of about 1.5 to 1.6 T and a saturation magnetostriction of less than $1 \times 10^{-6}$ as an absolute value. In the case of the multilayer film having a total thickness of about 20 μm comprising Fe—Ta—N layers having an uniform thickness of 0.6 μm and $SiO_2$ insulating layers having an uniform thickness of 0.15 μm, the saturation magnetic flux density decreases to about 1.3 T. Comparing it with the case (A), the saturation magnetic flux density decreases remarkably, which results in degradation of the recording characteristic at the high frequency band in relation to high coercive medium when it is used as a magnetic core head material.

As a result of electron diffraction figure by means of a transmission type electron microscope (TEM), there are observed a diffraction line (110) of α-Fe and a diffraction line (111) of TaN. From the dark field figure of these diffraction lines, it is determined that the α-Fe fine crystal is of an average grain size of about 5 nm and the Ta—N fine crystal is of an average grain size of about 2 nm. From a similar TEM observation, it is confirmed that there is shown a superior soft magnetic characteristic in the case that the α-Fe fine crystal is of an average grain size of less than 10 nm and the Ta nitride fine crystal is of an average grain size of less than 5 nm.

The description in this embodiment is directed to the soft magnetic film of Fe76.5 atom %-Ta10.5 atom %-N13 atom % system. However, it is further confirmed that the same above effect can be obtained in the case of Fe—Ta—N soft magnetic films mainly consists of Fe and contains 6-17 atom % of N and 7-15 atom %.

Furthermore, it is also confirmed that the same above effect can be obtained in the case of Fe—M—N soft magnetic film wherein M is at least one atom selected from the group consisting of Zr, Hf, Ti, Nb, Ta, V, Mo, W, Cr and Al so long as the soft magnetic layers, which mainly consists of Fe and contains 6-17 atom % of N and 7-15 atom % of M, are of an each thickness of 0.05 to 5 μm and laminated alternatively through each non-magnetic insulating layers of an each thickness of 5 to 300 nm. The non-magnetic layers or the soft magnetic layers preferably have at least 2 different thickness. Contrary to this, there is not obtained a good soft magnetic characteristic in the case of less than 6 atom % of N and less than 7 atom % of M. Further, in the case of more than 17 atom % of N and more than 15 atom % of M and less than 68 atom % of Fe, there is observed a decreased saturation magnetic flux density of less than 1T due to the decreased content of Fe in the soft magnetic layers.

In the other hand, it is observed that, the same above effect can be obtained in the case of Fe—M—B—N soft magnetic film wherein M is at least one atom selected from the group consisting of Zr, Hf, Ti, Nb, Ta, V, Mo, W, Cr and Al so long as the soft magnetic layers, which mainly consists of Fe and contains 6-17 atom % of N, 7-15 atom % of M and 0.5-13 atom % of B, are of an each thickness of 0.05 to 5 μm and laminated alternatively through each non-magnetic insulating layers of an each thickness of 5 to 300 nm. The non-magnetic layers or the soft magnetic layers preferably have at least 2 different thickness. In comparison with the above Fe—M—N multilayer film, a heat treatment carried out at a high temperature can provides the Fe—M—B—N multilayer film with a good soft magnetic characteristic having a superior high saturation magnetic flux density and low magnetostriction. However, there is not obtained a good soft magnetic characteristic in the case of less than 6 atom % of N, less than 7 atom % of M, less than 0.5 atom % of B and more than 86.5 atom % of Fe. Further, in the case of more than 15 atom % of N, more than 15 atom % of M, more than 13 atom % of B and less than 57 atom % of Fe, there is observed a decreased saturation magnetic flux density of less than 1T due to the decreased content of Fe in the soft magnetic layers.

It is clear from X ray diffraction analysis and TEM observation of the film structure of the Fe—M—N and Fe—M—B—N multilayer film that, the material comprises a mixed fine crystals of M nitride, M boride and α-Fe having expanded lattices due to solid-solution by M atom, N atom, B atom, M nitride and M boride. In the case of α-Fe fine crystals having an average grain size of less than 10 nm and M nitride or M boride having an average grain size of less than 5 nm, there is obtained a superior soft magnetic characteristic.

(Example 3)

By the same sputtering method as the Example 2, a soft magnetic multilayer film is formed on a non-magnetic ceramic substrate which is water cooled and has a thermal expansion coefficient of $115 \times 10^{-7}/°C$. by alternatively forming the Fe—Ta—N soft magnetic layer 1 having a thickness of 0.6 μm and comprising Fe 76.5 atom %, Ta 10.5 atom % and N 13 atom % and the $SiO_2$ insulating layer 2 having a thickness of 0.05 μm or the SiO$_2$ insulating layer 3 having a thickness of 0.15 µm. Then, the soft magnetic multilayer film is subjected to a heat treatment at a vacuum atmosphere of 550° C. with no magnetic field for one hour.

Figure 1:
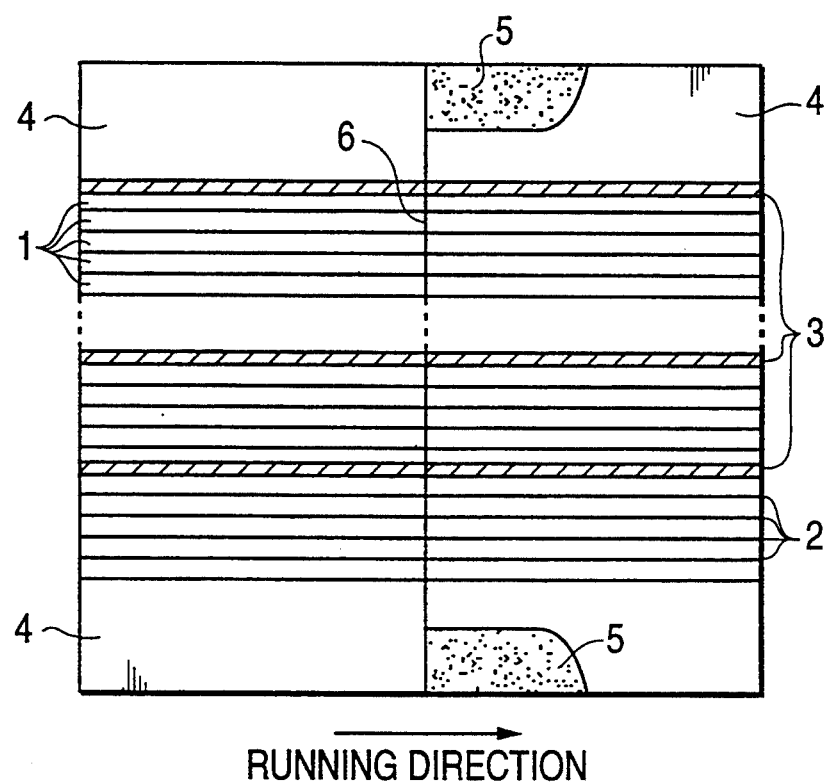
FIG. 1 is an enlarged plane view of the contacting surface of the laminated type magnetic head according to the present invention.

A laminated-type head as shown in FIG. 1 is manufactured by heat-treating with no magnetic field the soft magnetic multilayer film. Apparent from FIG. 1 showing enlargement of the head, the head is provided with as track width of 20 µm, a gap length of 0.2 µm, a gap depth of 20 µm and the number of turn of a coil is 20. Output of he head is measured as a self-recording reproducible characteristics at a relative speed of 21 m/s in a drum ester by use of MP tape having a coercive force of 119400 A/m. As compared with the laminated-type head made of the conventional multilayer film (C) prepared by alternatively laminating the soft magnetic layers having a uniform thickness of 2.7 µm and the SiO$_2$ insulating layers having a uniform thickness of 0.15 µm, C/N is improved by more than about 5 dB in a high frequency field of 30 MHz.

(Example 4)

Figure 2:
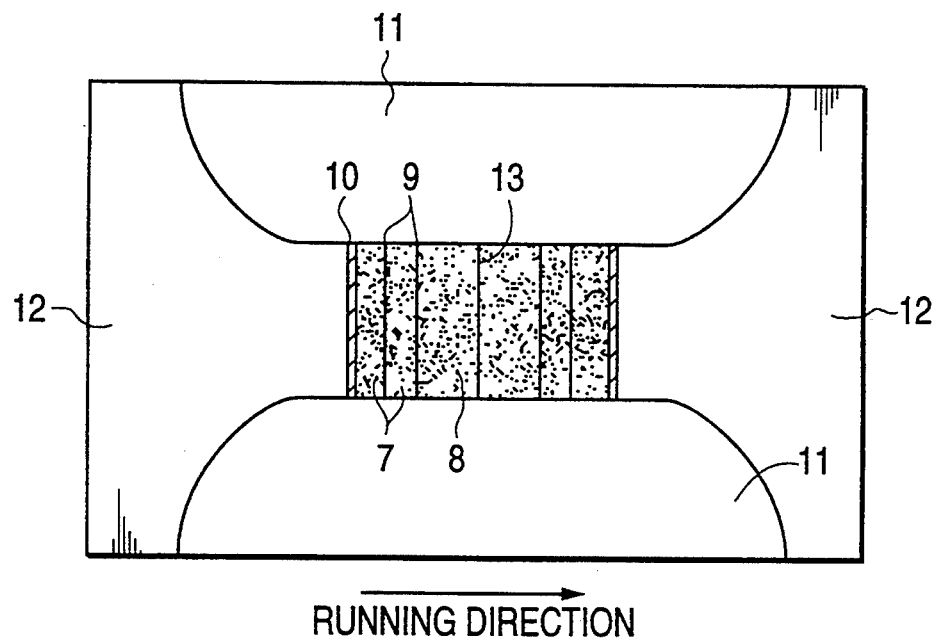
FIG. 2 is an enlarged plane view of the contacting surface of the MIG type magnetic head according to the present invention.

On the other hand, by the same sputtering method as the Example 2, a soft magnetic multilayer film having a total thickness of about 4 µm is formed on a non-magnetic ceramic substrate which is water cooled by alternatively forming 1) the Fe—Ta—N soft magnetic layer 7 comprising Fe 76.5 atom %, Ta 10.5 atom % and N 13 atom % and having a thickness of 1 µm, 2) the Fe—Ta—N soft magnetic layer 8 comprising Fe 76.5 atom %, Ta 10.5 atom % and N 13 atom % and having a thickness of 2 µm comprising Fe 76.5 atom %, Ta 10.5 atom % and N 13 atom %, 3) the SiO$_2$ insulating layer 9 having a thickness of 5 nm and 4) the SiO$_2$ insulating layer 10 having a thickness of 10 nm. Then, the soft magnetic multilayer film is subjected to a heat treatment at a vacuum atmosphere of 550° C. with non-magnetic field for one hour. A MIG type head as shown in FIG. 2 is manufactured by heat-treating in non-magnetic field the soft magnetic film of Fe—Ta—N system having a thickness of about 4 µm. Apparent from FIG. 2 showing an enlargement of the head, the head is provided with a track width of 20 µm, a gap length of 0.2 µm, a gap depth of 20 µm and the number of the turn of a coil is 20. Output of the head is measured as a self-recording reproducible characteristics at a relative speed of 4.5 m/s in a drum tester by use of MP tape having a coercive force of 119400 A/m. As compared with the MIG type head made of the film of Fe—Ta—N formed at non-bias condition, C/N is improved by more than about 2 dB in a high frequency field of 10 MHz.

The description in this embodiment is directed to the soft magnetic film of Fe76.5 atom %-Ta10.5 atom %-N13 atom % system. However, it is further confirmed that the same above effect can be obtained in the case of Fe—Ta—N soft magnetic films mainly consists of Fe and contains 5-17 atom % of N and 7-15 atom %.

Furthermore, it is also confirmed that the same above effect can be obtained in the case of Fe—M—N soft magnetic film wherein M is at least one atom selected from the group consisting of Zr, Hf, Ti, Nb, Ta, V, Mo, W, Cr and Al so long as the soft magnetic layers, which mainly consists of Fe and contains 5-17 atom % of N and 7-15 atom % of M, are of an each thickness of 0.05 to 5 µm and laminated alternatively through each non-magnetic insulating layers of an each thickness of 5 to 300 nm. The non-magnetic layers or the soft magnetic layers preferably have at least 2 different thickness.

In the other hand, it is observed that, the same above effect can be obtained in the case of Fe—M—B—N soft magnetic film wherein M is at least one atom selected from the group consisting of Zr, Hf, Ti, Nb, Ta, V, Mo, W, Cr and Al so long as the soft magnetic layers, which mainly consists of Fe and contains 6-17 atom % of N, 7-15 atom % of M and 0.5-13 atom % of B, are of an each thickness of 0.05 to 5 µm and laminated alternatively through each non-magnetic insulating layers of an each thickness of 5 to 300 nm. The non-magnetic layers or the soft magnetic layers preferably have at least 2 different thickness. In comparison with the above Fe—M—N multilayer film, a heat treatment carried out at a high temperature can provides the Fe—M—B—N multilayer film with a good soft magnetic characteristic having a superior high saturation magnetic flux density and low magnetostriction. Furthermore, a glass joining at a high temperature can be advantageously carried out on preparation of the magnetic head, so that a choice range of glass to be used as the joining agent can be extended, which results in improving the reliability of the magnetic head by using the glass joining agent having a sufficient joint strength and a superior wear resistance.

It is clear from X ray diffraction analysis and TEM observation of the film structure of the Fe—M—N and Fe—M—B—N multilayer film that, the material comprises a mixed fine crystals of M nitride, M boride and α-Fe having expanded lattices due to solid-solution by M atom, N atom, B atom, M nitride and M boride. In the case of α-Fe fine crystals having an average grain size of less than 10 nm and M nitride 10 or M boride having an average grain size of less than 5 nm, there is obtained a superior output of the magnetic head.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A soft magnetic multilayer film for a magnetic head comprising at least one film unit which comprises a plurality of soft magnetic layers made of Fe—M—N component alloy or Fe—M—B—N component alloy wherein M is at least one atom selected from the group consisting of Zr, Hf, Ti, Nb, Ta, V, Mo, W and Cr, characterized in that a plurality of the soft magnetic layers are laminated between a non-magnetic insulating layer on a bias-applied substrate by means of sputtering and are provided with a high magnetic permeability having a direction different from both neighboring soft magnetic layers through the non-magnetic insulating layer such that substantial magnetic isotropy is achieved.

2. The soft magnetic multilayer film according to claim 1, wherein the soft magnetic layer of Fe—M—N component consists mainly of Fe and contains 6-17 atom % of N and 7-15 atom % of M.

3. The soft magnetic multilayer film according to claim 1, wherein the soft magnetic layer of Fe—M—B—N component consists mainly of Fe and contains 6-15 atom % of N, 7-15 atom % of M and 0.5-13 atom % of B.

4. The soft magnetic multilayer film according to claim 2 or 3, wherein the soft magnetic layer is made of Fe—Ta—N or Fe—Ta—B—N component alloy and the non-magnetic insulating layer is made of $SiO_2$ or $Al_2O_3$.

5. The soft magnetic multilayer film according to claim 1, wherein the unit film is composed of at least two kinds of the soft magnetic layers having different thicknesses.

6. The soft magnetic multilayer film according to claim 5, wherein the soft magnetic layers have a thickness of 0.05 to 5 μm.

7. The soft magnetic multilayer film according to claim 1, wherein the unit film is composed of at least two kinds of the non-magnetic insulating layers having different thicknesses.

8. The soft magnetic multilayer film according to claim 6, wherein the non-magnetic insulating layers have a thickness of 5 to 300 nm.

9. The soft magnetic multilayer film according to claim 1, wherein each of the soft magnetic layers neighboring through the non-magnetic insulating layer are formed on the substrate with a different bias-power including zero by means of sputtering.

10. A magnetic isotropic head of a multi-structured and laminated type made of soft magnetic multilayer films, characterized in that a laminating unit of the multilayer film comprises a plurality of soft magnetic layers made of Fe—M—N component alloy or Fe—M—B—N component alloy wherein M is at least one atom selected from the group consisting of Zr, Hf, Ti, Nb, Ta, V, Mo, W and Cr, and are laminated between a non-magnetic insulating layer on a bias-applied substrate by means of sputtering and a plurality of the film units are laminated between a separating electric insulating layer for mainly preventing eddy current loss.

11. A magnetic isotropic head of MIG type made of soft magnetic multilayer film, characterized in that the multilayer film comprising a plurality of soft magnetic layers made of Fe—M—N component alloy or Fe—M—B—N component alloy wherein M is at least one atom selected from the group consisting of Zr, Hf, Ti, Nb, Ta, V, Mo, W and Cr, wherein the layers are laminated between a non-magnetic insulating layer on a bias-applied substrate by means of sputtering to be provided with a high magnetic permeability having a direction different from both neighboring soft magnetic layers through the non-magnetic insulating layer in a manner to have a substantial magnetic isotropy and further wherein the magnetic layers are sandwiched at the right and left sides in a running direction with a pair of separating non-magnetic insulating layers for preventing generation of a pseudo-gap due to diffusion between the ferrite and the magnetic layer.

12. The magnetic isotropic head according to claim 10 or 11, wherein the soft magnetic layers are laminated in a manner that total distribution regarding the direction of each magnetic permeability thereof is made symmetrically.

13. The magnetic isotropic head according to claim 10 or 11, wherein the soft magnetic layer of Fe—M—N component consists mainly of Fe and contains 6–17 atom % of N and 7–15 atom % of M.

14. The magnetic isotropic head according to claim 10 or 11, wherein the soft magnetic layer of Fe—M—B—N component consists mainly of Fe and contains 6–15 atom % of N, 7–15 atom % of M and 0.5–13 atom % of B.

15. The magnetic isotropic head according to claim 10 or 11, wherein the soft magnetic layer is made of Fe—Ta—N or Fe—Ta—B—N component alloy and the non-magnetic insulating layer is made of $SiO_2$ or $Al_2O_3$.

16. The magnetic isotropic head according to claim 10 or 11, wherein the unit film is composed of at least two kinds of the soft magnetic layers having different thicknesses.

17. The magnetic isotropic head according to claim 10 or 11, wherein the laminating unit film is composed of at least two kinds of the non-magnetic insulating layers having different thicknesses.

18. The magnetic isotropic head according to claim 10 or 11, wherein the soft magnetic layer has a thickness of 0.05 to 5 μm.

19. The magnetic isotropic head according to claim 10 or 11, wherein the non-magnetic insulating layer has a thickness of 5 to 300 nm.

20. The magnetic isotropic head according to claim 10 or 11, each of the soft magnetic layers neighboring through the non-magnetic insulating layer is formed on the substrate with a different bias-power including zero by means of sputtering.

21. A soft magnetic multilayer film for a magnetic head which comprises at least one film unit comprising a plurality of soft magnetic layers made of Fe—M—N alloy or Fe—M—B—N alloy wherein M is at least one atom selected from the group consisting of Zr, Hf, Ti, Nb, Ta, V, Mo, W and Cr, and a plurality of non-magnetic insulating layers, wherein the soft magnetic layers and the non-magnetic insulating layers are laminated alternately by means of sputtering, and the neighboring soft magnetic layers have a high magnetic permeability which indicates a different direction in a plane through the adjacent non-magnetic insulating layer to make all the soft magnetic layers show a substantial magnetic isotropy.

* * * * *